MOTOR CONTROL SYSTEM AND APPARATUS

Filed Sept. 5, 1967 2 Sheets-Sheet 1

INVENTOR:
Charles K. Pooley
By Keith D Beecher
ATTORNEY

MOTOR CONTROL SYSTEM AND APPARATUS

Filed Sept. 5, 1967

2 Sheets-Sheet 2

INVENTOR:
Charles K. Pooley
By Keith D. Beecher
ATTORNEY

United States Patent Office 3,510,742
Patented May 5, 1970

3,510,742

MOTOR CONTROL SYSTEM AND APPARATUS

Charles K. Pooley, Franklin Square, N.Y., assignor to Gauss Electrophysics, Inc., Santa Monica, Calif., a corporation of California Filed Sept. 5, 1967, Ser. No. 665,597
Int. Cl. H02p 5/00
U.S. Cl. 318—313 5 Claims

ABSTRACT OF THE DISCLOSURE

The invention is concerned with an improved control system and apparatus for an electric motor which may, for example, be the drive motor in a magnetic recorder/reproducer. The invention relates particularly to an improved optical tachometer system and apparatus for precisely maintaining the speed of the drive motor at a predetermined value.

Background of the invention

It is especially desirable in magnetic tape recorder/reproducer system and apparatus that the magnetic tape be driven at a predetermined invariable speed. This is so that the information may be recorded on the magnetic tape and subsequently reproduced therefrom without any distortion due to spurious tape movement during the recording or reproducing process.

Magnetic and optical tachometers have been used in the past in magnetic recorders to control the speed of the drive motor. Such tachometers, for example, in each instance, usually include a toothed, or slotted, wheel which is driven by the motor whose speed is to be controlled. The toothed wheel is caused to generate a series of pulses whose repetition frequency is a function of the speed of the motor. These pulses are compared, for example, with one another, or with pulses derived from a reference source, in an appropriate discriminator circuit. The discriminator circuit generates an error signal which changes in amplitude when there is any tendency for the motor to depart from its predetermined speed. This error signal is then used in an appropriate servo network to return the motor to its predetermined speed.

The optical tachometer system and apparatus to which the concepts of the present invention relate includes a slotted disc or wheel, a light source and a photocell. The slotted disc is interposed between the light source and the photocell, and it is rotatably driven by the motor to be controlled. The rotating disc effectively "chops" the light beam from the light source insofar as its incidence on the photocell is concerned. In this manner, the photocell is caused to generate electric pulses whose repetition rate is directly proportional to the rotational speed of the motor.

As mentioned above, the pulses derived from the photocell are compared in an appropriate discriminator circuit, and the resulting error signal is used in a servo network to control the speed of the motor and to maintain the speed at a predetermined value.

In order for the optical tachometer to provide an accurate control, it is essential that the angular distance between successive slots in the disc be exactly the same, or else irregular shifts will occur in the spacing between the pulses generated by the photocell. This irregular occurrence of the generated pulses creates errors, and the prior art apparatus utilizes expensive and precisely machined components so as to minimize irregularities between successive pulses from the tachometer due to tolerances in the slot sizes and angular spacings.

The embodiment of the invention to be described includes an optical tachometer having a light chopper disc which, in turn, has for example two slots formed therein, and which provides two interruptions of the light beam from the source for each rotation of the disc. The apparatus also includes a simple means whereby adjustments may be made precisely to cause the slots effectively to be displaced exactly 180° from one another, insofar as the interruption of the light beam is concerned, for the proper periodic activation of the photocell. The aforesaid feature of the tachometer apparatus of the invention is achieved by means of a simple expedient, and without the need for expensive or precisely machined and accurately assembled components.

Summary of the invention

The present invention provides an optical tachometer system and apparatus including a light copper disc having a pair of slots therein which are configured so that a light source and a photocell may be adjusted with respect to the disc so as to cause the light from the source to be incident on the photocell at effective accurately spaced 180° angular positions of the wheel. The system also includes an improved discriminator circuit for utilizing the pulses generated by the photocell to provide an effective servo control signal for the motor.

Description of the Illustrated Embodiments

Figures 1, 4, 5:
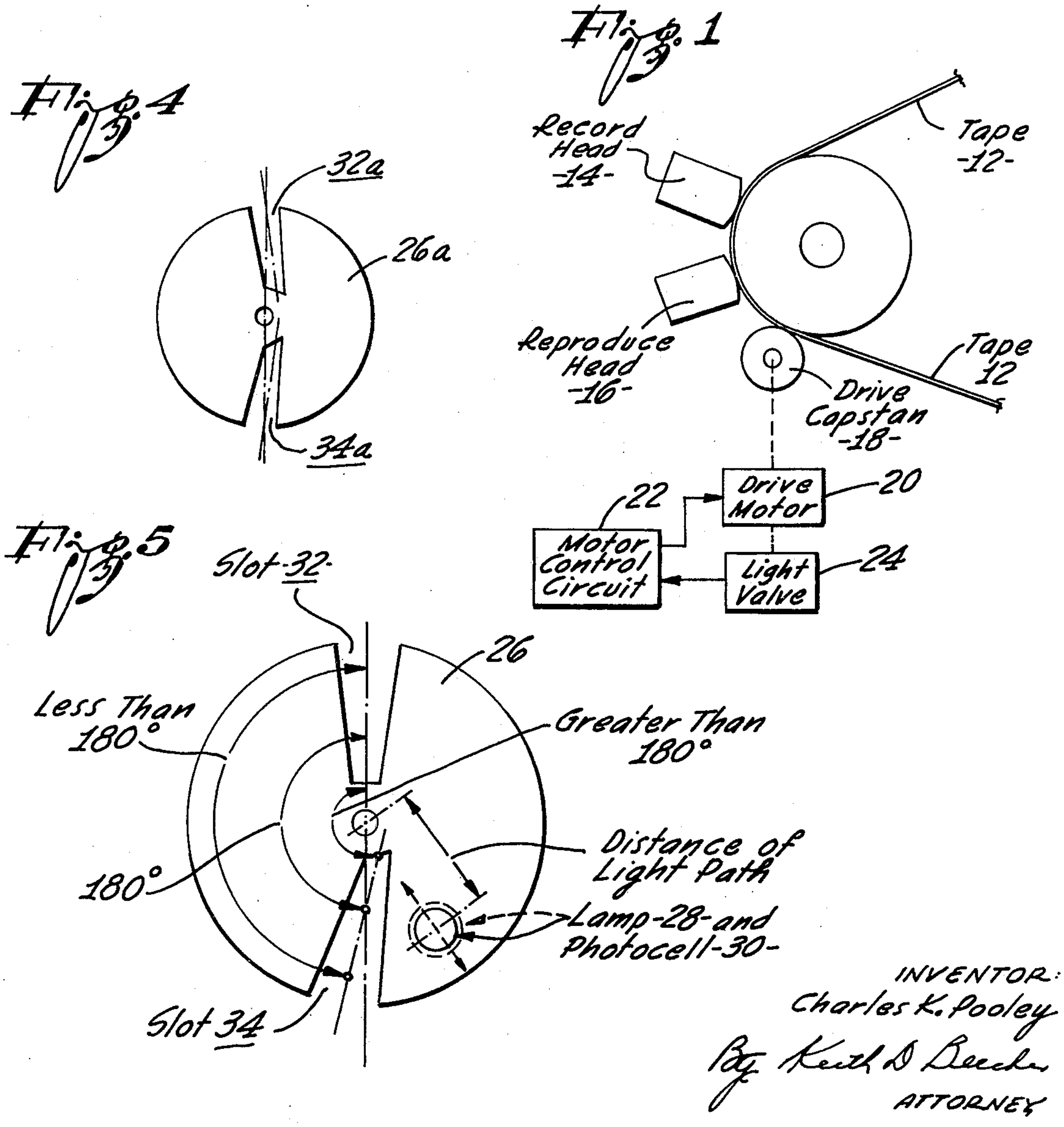
FIG. 1 is a schematic representation of a portion of a magnetic tape recorder/reproducer, showing the manner in which the drive motor used in the apparatus may be controlled to have a predetermined invariable speed.
FIG. 4 shows a tachometer disc having slots therein configured in accordance with a second embodiment of the invention.
FIG. 5 shows the disc of FIG. 3, with further notations thereon indicating the manner in which adjustments may be made to achieve a precise control of the pulses generated by the tachometer apparatus.

The apparatus of FIG. 1 may be a magnetic tape recorder/reproducer unit of the type described, for example, in copending application Ser. No. 665,347 filed Sept. 5, 1967. The particular apparatus described in the copending application includes a cartridge which is removably insertable in the housing of the apparatus. A rotatably mounted pinch roller 10 is positioned in a cartridge, and the cartridge also contains a reel of tape 12 which extends around the pinch roller 10. The apparatus of FIG. 1 further includes an electromagnetic record head 14, and an electromagnetic reproduce head 16, together with a drive capstan 18; the latter elements being mounted in the housing of the unit.

When the cartridge is inserted into the housing, the pinch roller 10 bears against the heads 14 and 16 and against the drive capstan 18. The drive capstan squeezes the tape 12 against the rim of the pinch roller 10, and when it is rotatably driven, it causes the tape to be drawn past the record head and past the reproduce head. Both the pinch roller 10 and the drive capstan 18 may have rubber-like rims, so as to facilitate the drive of the tape by these elements.

The drive capstan 18 is driven by a drive motor 20 which is shown in block form. As mentioned above, it is most important for the drive motor to drive the capstan 18 at a predetermined invariable speed, so that the tape 12, at all times, may be drawn at a constant speed past the heads 14 and16. The drive motor 20 is controlled to have such a constant speed by means of a motor control unit 22.

The drive motor is mechanically coupled to a light valve 24, which is in the form of an optical tachometer as will be described, and the pulse output from the light valve 24 is applied to the motor control circuit 22. The repetition frequency of the pulses from the light valve 24 are indicative of the speed of the drive motor 20. These pulses are processed in the motor control circuit 22, as will be described, and the control circuit introduces power to the drive motor which varies in response to variation in the repetition frequency of the pulses from the light valve 24 so as to compensate for any tendency of the drive motor to move from its predetermined speed.

Figure 2:
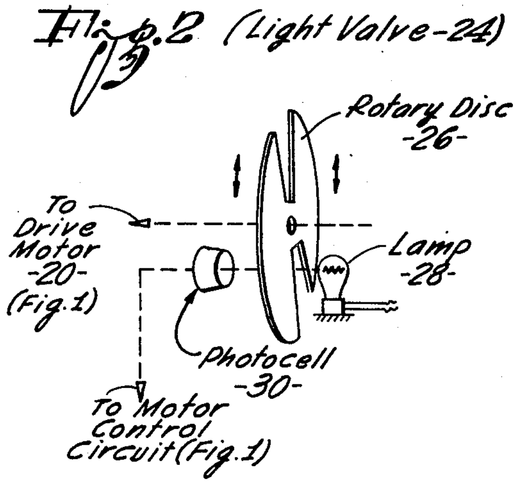
FIG. 2 is a schematic representation of a light valve assembly constructed in accordance with the concepts of the invention, and which is used in the optical tachometer apparatus and system of the invention.

The light valve 24, as shown by the schematic representation of FIG. 2, includes a slotted disc 26 which is mechanically coupled to the drive motor 20 to be rotated thereby. A light source 28 in the form, for example, of an electric lamp is positioned on one side of the disc 26, and a photocell or equivalent optical detector 30 is positioned on the other side of the disc. Then, as the disc 26 is rotated, it periodically interrupts the light from the lamp 28 as that light is incident on the photocell 30. The photocell 30 and the lamp 28 are adjustable, as indicated by the arrows in FIG. 2, so that they may be moved in unison in a radial direction with respect to the disc 26. The lamp and photocell may be set in any desired radial position with respect to the center of the disc.

Figure 3:
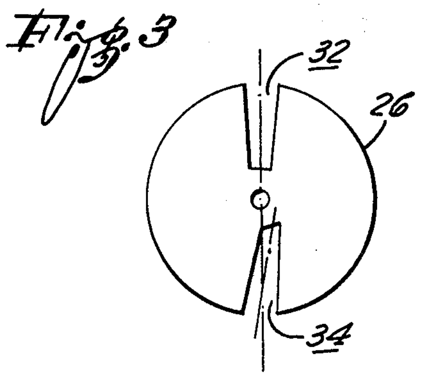
FIG. 3 shows a tachometer disc having a pair of slots formed therein, the slots being configured in accordance with one embodiment of the invention, so as to achieve the desired results of the invention.

The disc 26 may have a shape such as shown in FIG. 3. The disc of FIG. 3 includes a first slot 32 which has a pair of edges extending along respective radii of the disc 26. The disc also has a second slot 34 which is positioned diametrically opposite to the slot 32, and which has its edges extending along lines which are disposed at an angle to the corresponding radii.

It will be appreciated, therefore, that as the lamp 28 and photocell 30 are moved radially with respect to the disc 26, they are effectively disposed at different radial distances from the center of the disc. In the embodiment of FIG. 3, the arcuate width of each of the slots 32, 34 is the same for any particular radial distance from the center of the disc 26. However, the angular distance between the slots varies for the different radial distances.

This is indicated by the notations of FIG. 5, which shows that as the lamp and photocell are moved radially with respect to the disc 26, the angular distance between the two slots may be exactly 180°, less than 180°, or greater than 180°. For normal operation of the system, the lamp and photocell 28 and 20 are adjusted until the angular distance between the slots, insofar as the light incident on the photocell 30 is concerned, is exactly 180°. This provides a simple expedient for assuring that there will be no irregularities in the spacing between the successive pulses generated by the photocell due to mechanical tolerances.

The disc 26*a* of FIG. 4 is essentially similar to the disc 26 of FIG. 3. However, in the disc 26*a*, the slot 32*a* is disposed at a first angle with respect to the corresponding radii of the disc 26*a*, and the slot 34*a* is disposed at a second angle equal to the first angle but in the adjacent quadrant. Again, it will be appreciated that a radial adjustment of the lamp 28 and photocell 30 permit the angular distances between the slots, insofar as the light incident on the photocell 30 is concerned, to be varied from greater than 180° to less than 180°, so that a setting corresponding precisely to 180° may be established.

In the embodiments shown in FIGS. 3 and 4, the slots in the disc 26 and 26*a* produce signals of equal duration. This is because the width of the slots in each instance, as measured along an arc of a particular radius, is a constant fraction of the circumference of the disc at that radius. Also, the slots are configured, as described above, so that the angular distance measured from a point in one slot at a particular radial distance from the center of the disc to a corresponding point in the other slot changes with changes in the radial distance from the center of the disc.

For example, at some smaller radius, this angle will be more, or less, than 180°; whereas, at some greater radius, the angles will be less, or more, than 180°. Therefore, either the lamp and photocell may be adjusted radially with respect to the disc, or the disc may be adjusted radially with respect to the lamp and photocell, until the exact 180° relationship is achieved. The inclination of the slots can be selected to provide any desired sensitivity of the adjustment, since the sensitivity depends on the selected angles of the slots with respect to the corresponding radii.

If so desired, the slots can be configured to have different widths at the various radii, at which case pulses of different durations will be produced. This latter control provides for a pulse duration adjustment to be attained by the radial adjustment of the components.

Figure 6:
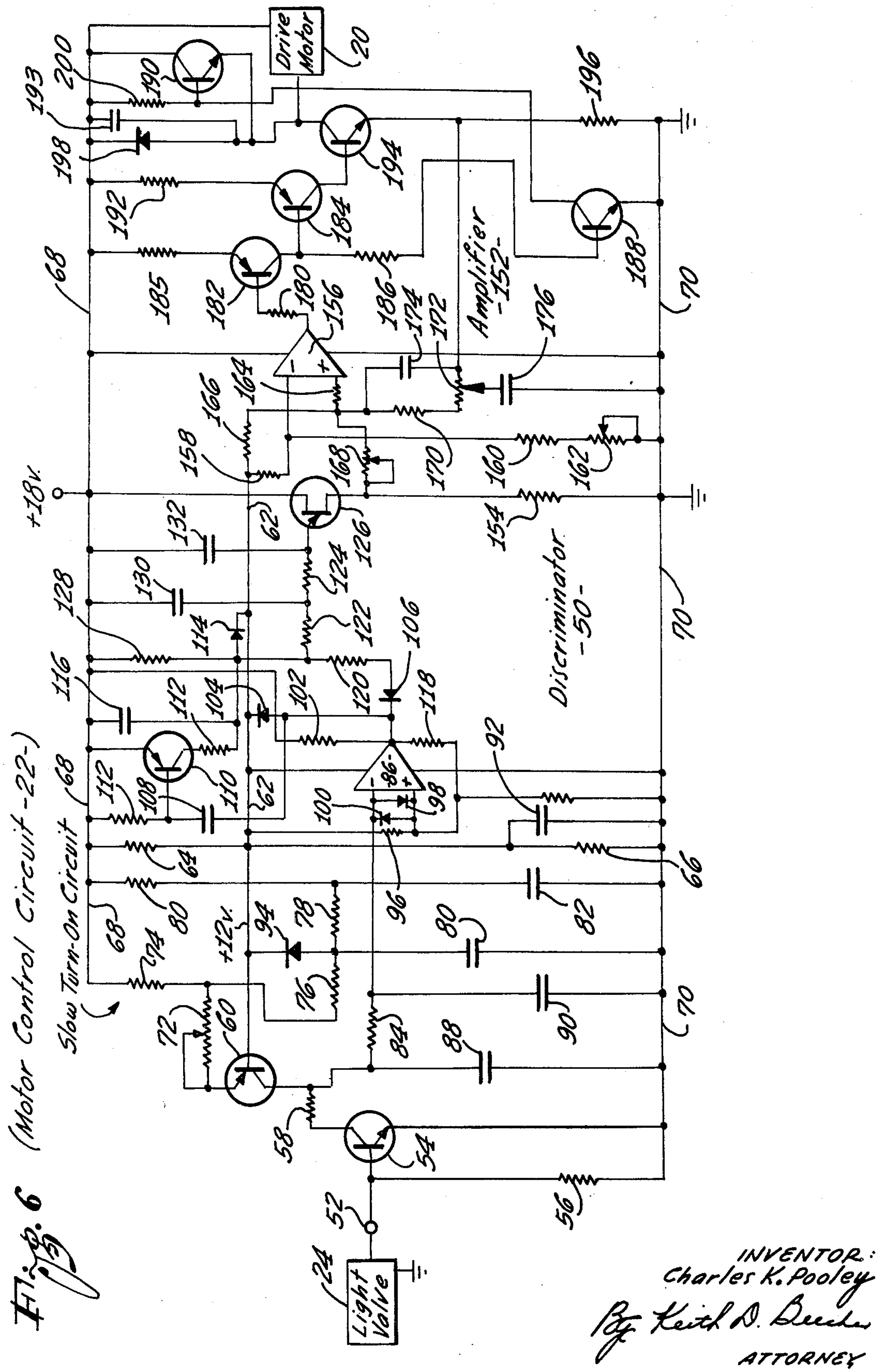
FIG. 6 is a circuit diagram of a control system for the drive motor of FIG. 1 incorporating an improved tachometer circuit, and utilizing the pulses produced by the optical tachometer apparatus of the invention.

The pulses derived from the light valve 24, as shown in FIG. 6, may be applied to a discriminator circuit 50. The discriminator circuit 50 includes an input terminal 52 which is connected to a NPN transistor 54 of the type presently designated 3565. The emitter of the transistor 54 is grounded, and its base is connected to a grounded resistor 56 having a resistance, for example, of one kilo-ohm. The collector of the transistor 54 is connected through a 100 ohm resistor 58 to the emitter of a PNP transistor 60. The base of the PNP transistor is connected to a lead 62 which is established, for example, at a 12 volt value by means of a pair of potential divider resistors 64 and 66 having respective resistances of 330 and 820 ohms. The resistors 64 and 66 are connected between an 18 volt lead 68 and a ground lead 70.

The emitter of the transistor 60 is connected to a 50 kilo-ohm potentiometer 72 which is connected through a one kilo-ohm resistor 74 to the lead 68, and which is also connected to a further resistor 76. The resistor 76 is connected to a resistor 78 which, in turn, is connected to a further resistor 80, the latter resistor being returned to the 18 volt lead 68. The junction of the resistors 76 and 78 is connected to a grounded capacitor 80 of 100 micro-microfarads, and the junction of the resistors 78 and 80 is connected to a similar grounded capacitor 82.

The collector of the transistor 60 is connected through a resistor 84 to the negative input terminal of an integrated circuit 86 of the type presently designated 3005. The junction of the resistors 58 and 84 is connected to a grounded capacitor 88 of .22 microfarad, whereas the resistor 84 is connected to a grounded capacitor 90 of .05 microfarad. The resistor 66 is shunted by a 25 micro-microfarad capacitor 92. A diode 94 is connected from the junction of the resistors 76 and 80 to the 12 volt lead 62. The 12 volt lead is also connected through a 22 kilo-ohm resistor 96 to the positive input terminal of the integrated circuit 86. A pair of back-to-back diodes 98 and 100 are connected between the input terminals of the integrated circuit. These diodes, and all the other diodes in the circuit, many, for example, be of the type designated IN456.

Further terminals of the integrated circuit 86 are connected to the 12 volt lead 62 and to ground to apply an exciting voltage to the circuit. The output terminal of the integrated circuit 86 is connected through a resistor 102 to the 18 volt lead. This resistor, for example, may have a resistance of 10 kilo-ohms. The output terminal of the integrated circuit is also connected to the anode of a diode 104 and to the cathode of a diode 106. The cathode of the diode 104 is connected to the 12 volt lead 62. The ouptut terminal of the integrated circuit is also connected through a .0022 microfarad capacitor 108 to the base of a PNP transistor 110. The base of the transistor is connected to the 18 volt lead 68 through a one kilo-ohm resistor 112, and the emitter of the transistor is directly connected to that lead. The collector of the transistor 110 is connected to a 220 ohm resistor 112 which, in turn, is connected through a diode 114 to the 12 volt lead 62.

A capacitor 116 of, for example, .022 microfarad is connected from the junction of the resistor 112 and diode 114 to the 18 volt lead 68. A resistor 118 of, for example, 100 kilo-ohms, connects the positive input terminal of the integrated circuit 86 to the output terminal. The anode of the diode 106 is connected through a pair of resistors 120 and 122 and through a resistor 124 to the gate electrode of a field effect transistor 126. The resistor 120 may have a resistance of 15 kilo-ohms, the resistor 122 may have a resistance of 100 kilo-ohms, and resistor 124 may have a resistance of one megohm. The junction of the resistors 120 and 122 is connected through a 22 megohm resistor 128 to the 18 volt lead 68. The junction of the resistors 122 and 124 are connected through a .02 microfarad capacitor 130 to that lead, and the resistor 124 is connected to the lead through a .002 microfarad capacitor 132.

The discriminator circuit 50 described hereinabove, operates in the following manner: The pulses yielded by light valve 24 are at a rate which depends on motor speed, and these pulses act to turn on transistor 54, which functions to discharge capacitors 88 and 90. These capacitors are recharged at a constant rate by a current source controlled by transistor 60. Potentiometer 72 acts to adjust the charging rate and thereby to vary the speed of drive motor 20 as as to set this speed to the desired value.

As a consequence, a ramp or sawtooth wave is established at the high voltage side of capacitor 90 which is related inversely to the frequency of the input pulses applied to transistor 54. The ramp is fed to circuit 86, which is a Schmitt trigger whose output is at a high potential level only when the voltage across capacitor 90 is below a predetermined threshold value. The time spent at the high level is a constant, for it is determined by the time it takes capacitor 90 to be recharged from nearly zero volts to the threshold value, by the current source controlled by transistor 60. With the aid of diode 104 and resistor 102, the output of Schmitt trigger 86 is clamped to prevent it from rising above the 12-volt line.

Thus yielded by the circuit is a variable-duty cycle which is a function of the input pulse repetition rate. The trigger remains in the high potential state for a constant time, as determined by the setting of potentiometer 72, the balance of the time between cycles being in the low potential state. As the pulse rate from light valve 24 increases, the percentage of time spent in the low potential state in the duty cycle diminishes to zero.

Capacitor 116 acts to integrate the variable "on" time pulses, this capacitor acting in conjunction with diode 106 and resistor 120 which prevent discharge thereof back into the trigger, so that its negative-going voltage is substantially proportional to the "on" time of the trigger. At the leading edge of each "on" pulse produced by the Schmitt trigger, integrating capacitor 116 is discharged by means of transistor 110, which is rendered operative by transients passing through capacitor 108. Diode 114 clamps the voltage so that capacitor 116 does not discharge to a potential much above the 12-line voltage By means of resistor 128, which has a very large value (i.e., 22 megohms), and the use of field-effect transistor 126, the voltage established across capacitor 116 is held fairly constant between charging pulses, this constituting a sample and hold circuit which minimizes the need to filter the output to obtain an average reading. Capacitors 130 and 132 and resistors 122 and 124 form a filter having a short-time constant functioning to filter out switching transients.

Hence the output of the discriminator is a smooth D-C voltage whose magnitude varies in accordance with input pulse frequency, with substantially no delay in respect to changes in frequency, providing a fast response time. By means of resistor 168, this output is fed into the usual closed-looped servo, causing motor 20 to rotate at such speed that the pulse frequency from light valve 24 gives rise to an output from the trigger which has a small duty cycle and in a sensitive function of speed.

It is to be noted that the voltage produced by field effect transistor 126 is an error signal whose value is compared with a reference value representing the desired speed, thereby to produce a control signal reflecting the deviation from the desired speed, which control signal acts on the motor circuit to restore its speed to the desired value in accordance with standard servo system practice.

Transistors 188 and 190 in conjunction with resistors 186 and 200 function as a dynamic braking circuit. When the amplifier is turned off by reversing the trigger or by operation of the power switch, transistor 188 is rendered inoperative, allowing transistor 190 to turn on fully and thereby short out the back EMF of the motor, so that it slows down to a stop more rapidly than if it were permitted to coast to a stop.

The transistor 60, and its associated circuit including the resistors 74, 76, 78, 80 and the diode 94 provide a limiting circuit, so that when the system is first turned on, the output from the discriminator is limited to a predetermined value for a "slow start" of the drive motor.

The circuit also includes an amplifier 152 which amplifies the signal derived from the discriminator 50 and which applies the signal to the drive motor 20 so as to control the speed at which the driver motor is driven. The amplifier 152 includes the field effect transistor 126 whose drain electrode is connected directly to the 18 volt lead 68, and whose source electrode is connected through 12 kilo-ohm resistor 154 to the ground lead 70. The amplifier includes an integrated circuit of the type presently designated 709C and which is indicated as 156.

The negative input terminal of the integrated circuit 156 is connected to the 12 volt lead 62 through a 22 kilo-ohm resistor 158, and to the ground lead 70 through a 68 kilo-ohm resistor 160 and through a 50 kilo-ohm potentiometer 162. The positive input terminal of the integrated circuit 156 is connected through a 10 kilo-ohm resistor 164, and through a 4.7 kilo-ohm resistor 166, to the 12 volt lead 62. The resistor 164 is connected through a 10 kilo-ohm potentiometer 168 to the source electrode of the field effect transistor 126.

The junction of the resistors 164 and 168 is connected to a resistor 170 which, in turn, is connected to one side of a 50 kilo-ohm potentiometer 172. The resistor 170 has a resistance, for example, of 6.8 kilo-ohms. The junction of the resistor 164 and potentiometer 168 is coupled through a capacitor 174 to the other side of the potentiometer 172. The capacitor 174 has a capacity, for example, of .0022 microfarad. The movable arm of the potentiometer 172 is connected to a grounded capacitor 176 which has a capacity, for example, of 280 micro-microfarads.

The integrated circuit 156 is also connected to the 18 volt leads 68 and to the ground lead 70 for energizing purposes. The output terminal of the integrated circuit is connected through a 2.2 kilo-ohm resistor 180 to the base of a PNP transistor 182. The emitter of the transistor 182 is connected to the 18 volt lead 68 through a 560 ohm resistor 185. The collector of the transistor 182 is connected to the base of a further PNP transistor 184, and to a 68 ohm resistor 186. The resistor 186 is connected to the base of an NPN transistor 188. The emitter of the transistor 188 is grounded, and the collector is connected to the base of an NPN transistor 190.

The emitter of the transistor 184 is connected to the 18 volt lead 68 through a 220 ohm resistor 192, and the collector of that transistor is connected to the base of a NPN transistor 194. The emitter of the latter transistor is connected back to the potentiometer 172 and to a 33 ohm grounded resistor 196. The collector of the transistor 194 is connected through a diode 198 to the 18 volt lead 68, and the collector is also connected to the emitter of the transistor 190 and to one side of the armature of the drive motor 20.

A capacitor 193 having a capacity, for example, of 20 micro-microfarads is shunted across the diode 198. The base of the transistor 190 is also connected through a resistor 200 to the positive terminal of the 18 volt source. The resistor 200, for example, has a resistance of 560 ohms. The collector of the transistor 190 is directly connected to the 18 volt terminal, as is the other terminal of the armature of the drive motor 20.

The amplifier 152 serves to produce driving energy for the drive motor 20, so that the drive motor may be driven at a predetermined speed, as established by the potentiometer 72. Then, any tendency for the drive motor to vary from the pre-established speed causes the discriminator circuit 50 to produce a compensating change in the DC output level from the discriminator. This change in DC level is amplified in the amplifier 152 so as to produce a compensating change in the current through the drive motor so as to bring the drive motor back to the pre-established speed. The amplifier 152 is a degenerative feed back amplifier, and the proper phase of the feed-back may be adjusted by adjustment of the potentiometer 172.

The invention provides, therefore, an improved optical tachometer type of speed control circuit for an electric motor, by means of which precise and accurate control may be achieved without the need for close tolerances or unduly expensive components.

While a particular embodiment of the invention has been shown and described, modifications may be made. It is intended in the claims to cover the modifications which come within the scope of the invention.

What is claimed is:

1. An optical tachometer control system and apparatus for an electric motor including: a light source; a photo cell; and a slotted disc mechanically coupled to the motor to be rotatably driven thereby and interposed between said light source and said photo cell periodically to interrupt the light from said light source incident on said photo cell as said disc is rotated, said disc having at least one pair of light transmitting slots therein configured so that the angular distance between the slots at any particular arc is a function of the radial distance of said arc from the center of said disc, and so that the amount of arc defined by each of said slots at a given radial distance is the same; and said photo cell and light source being adjustable radially with respect to said disc to a position in which the effective angular distance between the slots is constant as the disc rotates.

2. The optical tachometer control system and apparatus defined in claim 1, in which said effective angular distance between said slots may be varied from less than 180° to more than 180° by the radial adjustment of said light source and photo cell, said photo cell and light source being adjusted radially with respect to said disc until said effective angular distance between the slots is constant at 180° as the disc rotates.

3. The optical tachometer control system and apparatus defined in claim 1, in which said slots have straight edges which extend in a generally radial direction with respect to said disc, and at least one of said slots has its edges disposed at an angle to the corresponding radii of said disc.

4. The optical tachometer control system and apparatus defined and claimed in claim 1, in which said disc has a first slot having straight edges extending along corresponding radii of said disc, and in which said disc has a second slot diametrically opposite to said first slot and having straight edges extending at a predetermined angle to the corresponding radii of said disc.

5. The optical tachometer control system and apparatus defined in claim 1, in which said disc has a first slot having straight edges extending at a predetermined angle to the corresponding radii of said disc, and in which said disc has a second slot diametrically opposite to said first slot and having straight edges extending at a second predetermined angle to the corresponding radii of said disc, said second angle being equal to said first angle but in the adjacent quadrant.

References Cited

UNITED STATES PATENTS

| | | | |
|---|---|---|---|
| 2,720,639 | 10/1955 | Maltby | 318—313 |
| 2,968,756 | 1/1961 | Devol | 318—480 |
| 2,995,694 | 8/1961 | Sorkin et al. | 318—480 |
| 3,096,444 | 7/1963 | Seward | 318—313 |
| 3,231,807 | 1/1966 | Willis | 318—313 |
| 3,317,804 | 5/1967 | Baker et al. | 318—480 |

FOREIGN PATENTS

| | | |
|---|---|---|
| 1,017,837 | 1/1966 | Great Britain. |

ORIS L. RADER, Primary Examiner

L. L. HEWITT, Assistant Examiner

U.S. Cl. X.R.

318—480